United States Patent [19]

Cockram

[11] 3,954,490

[45] May 4, 1976

[54] COATING COMPOSITIONS FOR GLASS FIBRES

[75] Inventor: David Ralph Cockram, Wigan, England

[73] Assignee: Pilkington Brothers Limited, St. Helens, England

[22] Filed: July 3, 1974

[21] Appl. No.: 485,659

[30] Foreign Application Priority Data
July 3, 1973 United Kingdom............... 31657/73

[52] U.S. Cl. ................................................ 106/99
[51] Int. Cl.² .......................................... C04B 7/02
[58] Field of Search ................. 106/90, 99; 428/392

[56] References Cited
UNITED STATES PATENTS
2,793,130   5/1957   Shannon et al. ...................... 106/99
3,758,319   9/1973   Ergene ................................... 106/99

*Primary Examiner*—J. Poer
*Attorney, Agent, or Firm*—Sughrue, Rothwell, Mion, Zinn & Macpeak

[57] ABSTRACT

A cementitious product and production method wherein the product comprises cement with reinforcing glass fibres therein which are coated with a composition which consists essentially of a protective material to reduce deterioration of the glass fibres, the material being a monocyclic or polycyclic aromatic compound which has at least three hydroxyl groups on the aromatic ring, or when a polycyclic compound is employed, on at least one of the aromatic rings. Preferably, the aromatic compound is soluble in a calcium hydroxide solution, and a preferred such compound is pyrogallol. The composition can also contain a film-forming agent such as a polyvinyl acetate of cationic character or a polyethylene glycol of non-ionic character, as well as a linking agent such as a silane.

38 Claims, 8 Drawing Figures

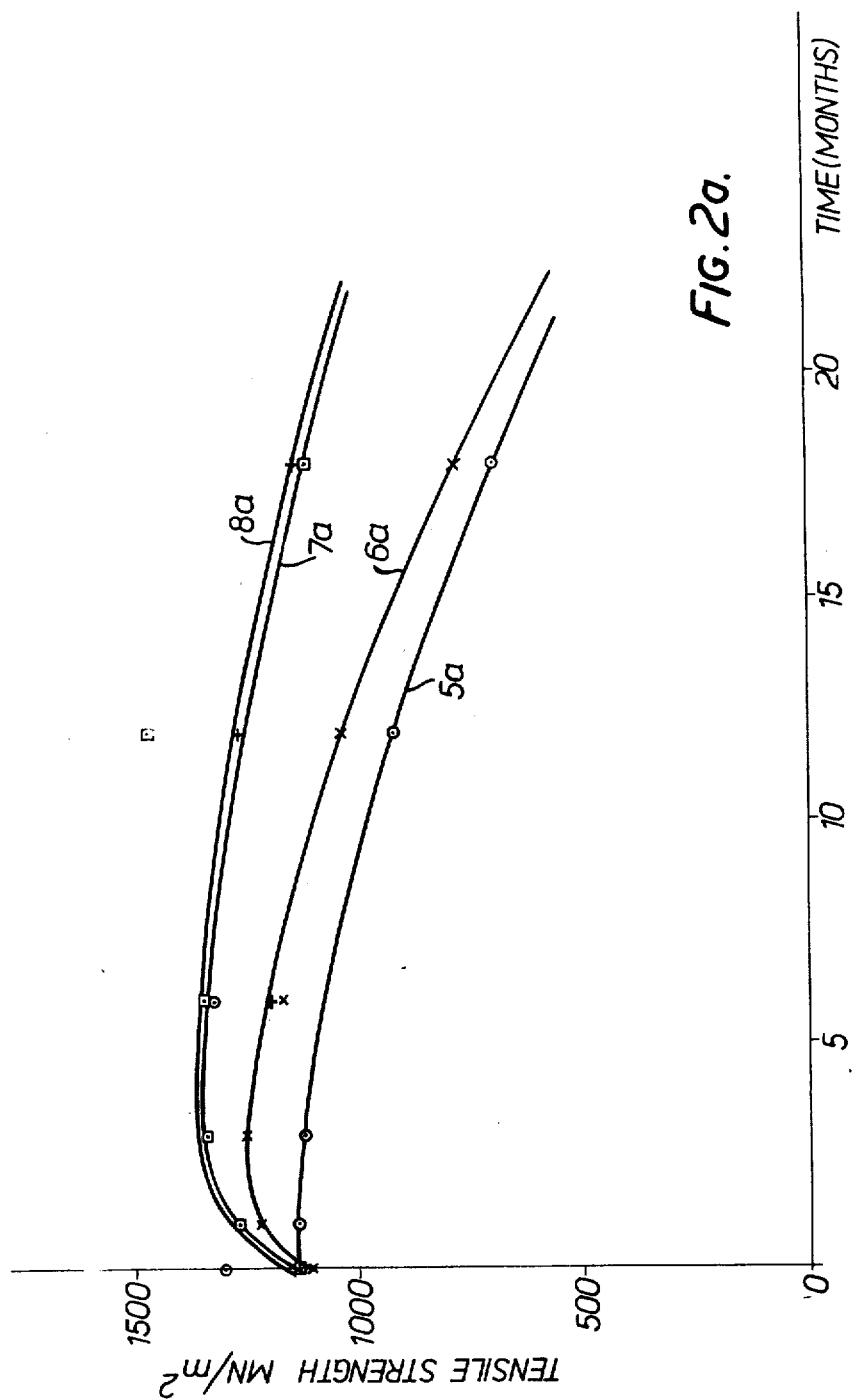

COATING COMPOSITIONS FOR GLASS FIBRES

BACKGROUND OF THE INVENTION

1. Field of the Invention

This invention relates to coating compositions for glass fibres, more particularly glass fibres which are intended for use as reinforcement in cement products. In the alkaline environment of a normal Portland cement, which is mainly due to the presence of lime (calcium hydroxide), fibres of generally available glass compositions, such as that widely known as E-glass, are rapidly attacked and weakened so that the additional strength imparted to the cement by the glass fibres is rapidly lost.

2. Description of the Prior Art

Various alkali-resistant glass compositions have been devised which retain their strength better in cement.

Thus British Patent Specification No. 1,200,732 (National Research Development Corporation) describes and claims a composite fibre/cementitious product comprising fibrous reinforcing material distributed throughout a cement matrix, in which the reinforcing material is primarily a glass having per se a degree of alkali resistance such that when tested in the form of an abraded fibre of length 2½ inches and diameter of from 0.4 to $1.0 \times 10^{-3}$ inches said fibre has a tensile strength of at least 100,000 p.s.i. after treatment with saturated aqueous $Ca(OH)_2$ solution at 100°C for 4 hours followed by successive washings at ambient temperature with water, then with aqueous hydrochloric acid (1%) for 1 minute, water, acetone, followed by drying, said fibre experiencing not more than 10% reduction in diameter during said test.

British Specification No. 1,243,972 (N.R.D.C.) discloses and claims such composite fibre/cementitious products in which the glass contains at least 65% $SiO_2$ and at least 10% $ZrO_2$ by weight. British Patent Specification No. 1,243,973 (N.R.D.C.) discloses and claims alkali-resistant glass fibres derived from a glass containing, in weight percentages, 65 – 80% $SiO_2$, 10 – 20% $ZrO_2$ and 10 – 20% of a network modifier which is an alkali metal oxide, an alkaline earth metal oxide or zinc oxide, said glass being one which has a tensile strength as set out above.

Further ranges of glass compositions for forming alkali-resistant glass fibres are disclosed and claimed in our British Patent Specification Nos. 1,290,528 and 1,389,019. No. 1,290,528 claims glass compositions for forming glass fibres which are to be incorporated as reinforcement in cementitious products, comprising, in molecular weight percentages:

| | |
|---|---|
| $SiO_2$ | 62% to 75% |
| $ZrO_2$ | 7% to 11% |
| $R_2O$ | 13% to 23% |
| $R'O$ | 1% to 10% |
| $Al_2O_3$ | 0% to 4% |
| $B_2O_3$ | 0% to 6% |
| $Fe_2O_3$ | 0% to 5% |
| $CaF_2$ | 0% to 2% |
| $TiO_2$ | 0% to 4% | wherein $R_2O$ represents $Na_2O$, up to 2 mol. % of which may be replaced by $Li_2O$, and $R'O$ is an oxide selected from the group consisting of the alkaline earth metal oxides, zinc oxide (ZnO) and manganous oxide (MnO), the balance if any consisting of other compatible constituents.

No. 1,389,019 claims glass compositions for use in the production of alkali-resistant continuously-drawn glass fibres, comprising in molar percentages on the oxide basis:

| | |
|---|---|
| $SiO_2$ | 67 to 82 |
| $ZrO_2$ | 7 to 10 |
| $R_2O$ | 9 to 22.5 |
| $F_2$ | 3 to 9 |
| $Al_2O_3$ | 0 to 5 |
| | (computed as $AlO_{1.5}$) | where R = Na, up to 5 mol. % of which may be replaced by Li or K, and the fluorine is included in substitution for oxygen in one or more of the oxides, the maximum value of the molar percentage represented by $SiO_2$ + $ZrO_2$ + $AlO_{1.5}$ being on a sliding scale dependent on the content of $ZrO_2$, ranging, when $F_2$ = 9 mol. %, from 89 mol. % when the $ZrO_2$ content is 7 mol. %, to 88 mol. % when the $ZrO_2$ content is 8.5 mol. % down to 87 mol. % when the $ZrO_2$ content is 10 mol. %, the said maximum value being reduced by a further 5 mol. % over the whole scale when $F_2$ = 3 mol. %.

South African Patent Specification No. 73/4476 (Owens-Corning Fiberglas Corporation) describes another range of alkali-resistant glasses, and glass fibres made from them, having compositions within the following range:

| | Weight Percent | Mole Percent |
|---|---|---|
| $SiO_2$ | 60 to 62 | 65 to 67 |
| CaO | 4 to 6 | 4.5 to 6.5 |
| $Na_2O$ | 14 to 15 | 14.5 to 16 |
| $K_2O$ | 2 to 3 | 1 to 2.5 |
| $ZrO_2$ | 10 to 11 | 5 to 6 |
| $TiO_2$ | 5.5 to 8 | 4.5 to 6.5 |

Although alkali-resistant glass fibres as described in the above Patent Specifications retain their strength in cement much better than fibres of conventional glasses, such as E-glass, there is nevertheless, a gradual deterioration over long periods.

When producing continuous glass fibres for any purpose, it is normal practice to coat the individual continuously drawn glass fibres immediately after drawing, with a size composition which provides a mechanical protection and a lubricant for the fibres to minimise breakage and abrasion during subsequent handling, such as the bringing together of numerous individual fibres to form a strand and the winding of the strand on a spool or drum. The size compositions previously used on glass fibres to be included in a cementitious matrix do not have any material effect on the long term resistance of the glass to attack by the alkalis in cement.

Protective coating compositions have also been applied to glass fibres at various stages in their production and handling, and it has, for example, been proposed to use a furane resin in such a coating for increasing the alkali resistance of the glass fibre material to render it suitable for use in reinforcing concrete.

SUMMARY OF THE INVENTION

According to the present invention, an improved cementitious product is produced by reinforcing a cementitious matrix with glass fibres which have been coated with a composition which contains as a protective material, at least one monocyclic or polycyclic aromatic compound which has at least three hydroxyl groups on the aromatic ring or (in a polycyclic compound) on at least one of the aromatic rings. This coating composition, when applied to a strand of glass fibres which is subsequently encased in a block of ordinary Portland cement paste which is allowed to cure and kept for 28 days at 50°C, produces an improvement of at least 10% in the tensile strength of the strand as compared with that of a strand similarly treated and tested but without application of said composition.

It has been found that the use of such an aromatic compound as a protective material in a size or other coating composition substantially reduces the rate of deterioration in strength of the glass fibres when incorporated in cementitious products, over long test periods. This effect is noticeable with the conventional E-glass fibres but a greater advantage is obtained with a glass which is already substantially alkali resistant, i.e. which satisfies the tensile strength requirement specified in Patent Specifications Nos. 1,200,732, 1,243,972 and 1,243,973 mentioned above. We prefer to use the size or other coating composition with glass fibres of the alkali-resistant glass compositions disclosed in our Patent Specifications Nos. 1,290,528 and 1,389,019, which can be fiberised at conventional fiberising temperatures of around 1320°C and below.

It is believed that the deterioration in strength of glass fibres incorporated in cementitious products is closely connected with solution-phase reactions or processes at the glass surface, one example of which is the deposition of calcium hydroxide crystals from the saturated solution of calcium hydroxide present in the cementitious matrix at the interface between the glass and the cementitious matrix, and that one effect of the above mentioned polyhydroxy aromatic compound in the coating composition is to inhibit or reduce such crystal formation. To produce this effect, it is believed to be advantageous for the aromatic compound to have at least a certain degree of solubility in a calcium hydroxide solution. Examination of stereoscan microscope of fibres which have been set in cement has also indicated that those fibres coated with compositions according to the invention, where attacked by the alkali in the cement, exhibit a considerably smoother etch pattern than that observed on fibres not so coated. This again could contribute to the higher strength retained by the coated fibres.

The polyhydroxy aromatic compound is preferably present in the coating composition in solution in a liquid carrier material, though it may alternatively be present as an emulsion or a finely divided suspension in such a material.

Classes of aromatic compounds which have been found suitable for use as protective materials in the present invention include:

a. Mono-cyclic 6-membered-ring aromatic compounds having at least three hydroxy groups substituted in the ring, e.g.
   1,2,3 tri-hydroxy benzene (pyrogallol)
   1,2,4 tri-hydroxy benzene (hydroxyhydroquinone)
   1,3,5 tri-hydroxy benzene (phloroglucinol)
b. Mono-cyclic 6-membered-ring aromatic compounds having at least three hydroxyl groups and at least one group substituted in the ring, and carboxylic acid salts and esters thereof, e.g.
   2,4,6 tri-hydroxy benzaldehyde,
   2,3,4 tri-hydroxy acetophenone,
   2,4,6 tri-hydroxy acetophenone,
   Tetrahydroxy-p-quinone dihydrate
   2,3,4 tri-hydroxy benzoic acid
   3,4,5 tri-hydroxy benzoic acid (gallic acid)
   Propyl gallate
   2,4,6 tri-hydroxy benzoic acid
c. Products obtained by oxidation of compounds of classes (a) and (b) in alkaline solution, e.g.
   Ammonium oxidation salt of pyrogallol
   Ammonium oxidation salt of gallic acid
d. A hetero-mono-cyclic 6-membered-ring aromatic compound having at least two nitrogen atoms within the ring and at least three hydroxyl groups as substituents in the ring, e.g.
   2,4,6 tri-hydroxy pyrimidine (barbituric acid)
e. A polycyclic aromatic hydrocarbon having at least three hydroxyl groups substituted into a single 6-membered ring, e.g.
   purpurogallin,
   1,2,4 tri-hydroxy anthraquinone (purpurin),
   2,4,6 tri-hydroxy benzophenone,
   Tannic acid,
   Naturally occurring vegetable tannins.

Many naturally occurring vegetable extracts contain chemical compounds having structures of the kind disclosed above, and can be used as the protective material in the coating compositions of this invention, e.g. quebracho bark, chestnut extract, suma extract, grape tannin, mimosa extract, and other materials falling in the general class of naturally occurring vegetable tannins.

In choosing a protective material from amongst the classes of aromatic compounds indicated as generally suitable above, care must be taken to ensure that substituent groups are not present in the molecule which counteract the protective activity of the three hydroxyl groups in reducing deterioration of the glass fibres, to such an extent as to make the compound unsuitable for use. It is therefore necessary, in selecting compounds for use, to carry out comparative screening tests where substituent groups are present, to ensure that these substituents have not reduced the protective activity to a level at which the rate of deterioration of the glass fibres is not materially reduced.

It will be realised that the polyhydroxy aromatic compounds listed above can be expected to react with alkalis, e.g. the calcium hydroxide in cement, due to their phenolic character. In addition, some of the compounds listed, such as pyrogallol, are oxidised by air when dissolved in an alkaline solution. Hence it is not to be expected that the aromatic compounds will retain their original composition when the coated fibres are incorporated in cement. The products of atmospheric oxidation of ammonia solutions of pyrogallol and gallic acid (class (c) above) have been found effective as protective materials, indicating that such changes in composition do not affect the protective activity of the material.

The concentration of the protective material required in the coating composition is dependent on several variables, and no exact limits can be stated which will encompass all the variables. The major factors to be considered in assessing the amount of protective material in the coating composition are as follows:

a. the protective material's solubility in the carrier material used,
b. the protective material's solubility in calcium hydroxide solution, and coupled with this the effectiveness of the particular compound being considered in reducing the rate of deterioration of the glass fibres in a cement matrix. Thus a compound of high effectiveness with a low solubility in calcium hydroxide solution may be effective at the same concentration as a compound of low effectiveness with a high solubility in calcium hydroxide solution, c. the cost of the protective material used. It may be economically more desirable to use less of a more effective high cost compound, than a larger quantity of a less effective lower cost compound, d. the quantity of coating composition being picked up on the fibre during the coating process, which will determine the actual quantity of protective material present at the interface between the glass fibre and the cement matrix.

In most cases a coating composition containing 5% by weight of protective material is effective, and it is unlikely that a coating composition containing more than 10% of protective material will be needed or economically feasible. However in a suitable carrier and with a highly effective compound concentrations of less than 1% could be feasible. A suitable screening test for assessing the effectiveness of the compounds is referred to above and described below in more detail with reference to the examples. Compounds may be ranked in order of effectiveness by reference to the percentage improvement found in the screening test, as compared with fibres coated in the same way as the fibres being tested except that no protective material is present in the coating composition. Compounds producing an improvement of less than 10% will not be considered suitable for use.

Where the composition is intended to be applied as a size to the fibres immediately after they have been drawn from the molten glass composition, it will normally further contain a film-forming agent and a linking agent, and will generally be water-based. The film-forming agent will then generally be in emulsion in the water. The linking agent is a substance, such as a silane, which helps to hold the size composition on the surface of the glass fibres, probably by forming links with -OH groups on the glass surface.

The film-forming agent may comprise a polyvinyl acetate of cationic character, i.e. a polymer at least 90% of which is formed of units derived from vinyl acetate and which has incorporated in it, during polymerisation, groups which give it a cationic character at acid pH values. Alternatively, to avoid any risk of breaking of the emulsion, the film-forming agent may be a polyethylene glycol of non-ionic character. The size composition preferably also contains a wetting agent to assist dispersion of the film-forming agent in the aqueous size.

Where the composition is intended to be applied as a coating composition at a later stage in the production or handling of the glass fibres, i.e. after sizing and combination of the individual fibres into a strand, the aromatic compound may be dissolved in a non-aqueous solvent.

The invention also includes glass fibres for use as reinforcement in cement products, coated with a composition as described above. Preferably the glass fibres are formed from an alkali-resistant glass composition containing at least 5 mol% $ZrO_2$.

The glass fibres may have a further protective coating applied after the glass fibres have been coated with the coating composition of the invention, so as to protect the coating composition of the invention from leaching during the initial contact with and curing of the cement matrix. This further protective coating may be, for example, an epoxy resin polymer, which can be applied as a solution in a solvent such as acetone. This protective coating is believed to act primarily during the initial contact of the coated fibre with the wet cement.

The invention further includes cementitious products reinforced with coated glass fibres as described above.

The invention also resides in a method of coating glass fibres to reduce their rate of deterioration when incorporated in cementitious products, comprising applying to the glass fibres a coating composition as described above.

The invention also resides in a method of forming a glass fibre reinforced cementitious product, wherein glass fibres are coated with a composition as described above and are subsequently incorporated into a cementitious matrix.

BRIEF DESCRIPTION OF THE DRAWINGS

FIG. 2a is a graphical representation similar to FIG. 2 comparing the effects of size compositions containing various amounts of pyrogallol, in samples stored in water at room temperature;

DETAILED DESCRIPTION OF THE INVENTION

Figure 1:
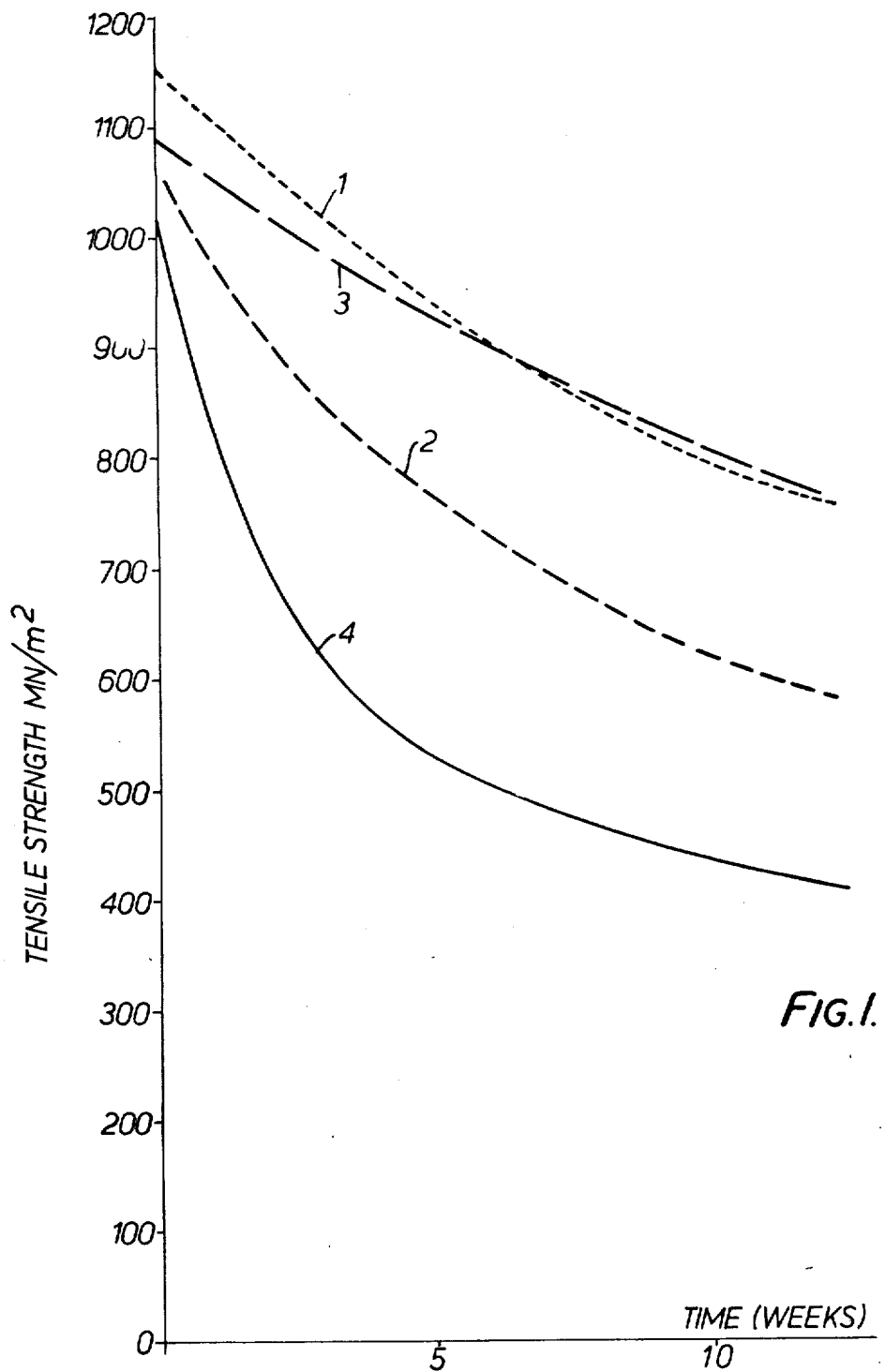
FIG. 1 is a graphical representation of the variation with time of the tensile strength of glass fibres in cement when sized with cationic polyvinyl acetate size compositions containing three different trihydroxy aromatic compounds, and with a cationic polyvinyl acetate size alone, under accelerated ageing conditions.

As mentioned above, it is necessary in selecting aromatic compounds for use as protective material to carry out comparative screening tests to assess the effectiveness of the compounds, particularly where the compounds contain substituent groups other than the necessary three hydroxyl groups in the aromatic ring. A suitable test which we have employed involves the following procedure: A strand of continuously drawn, water-sized glass fibres is prepared of a substantially alkali-resistant zirconia-containing glass (hereinafter referred to as Glass No. 1) having the following composition in mol %:

| | |
|---|---|
| SiO₂ | 69% |
| ZrO₂ | 9% |
| Na₂O | 15.5% |
| CaO | 6.5% |

A solution or suspension of the aromatic compound under test in a carrier liquid is applied to the strand, to form a coating thereon. It is advisable to test each aromatic compound in more than one carrier liquid to ascertain the optimum coating system for that compound. After coating, the middle section of each strand is encased in a block of ordinary Portland cement paste which is allowed to cure and kept for a period of, say, 28 days at elevated temperature, say 50°C, to produce accelerated ageing effects. The tensile strength of the encased part of the strand is then determined by applying load to both ends of the strand.

The results of a set of such comparative tests on glass fibre strands using 31 different trihydroxy aromatic compounds each in up to three different coating systems, and on strands coated with the carrier liquid alone of the respective coating system as a control, are set out in the following table.

The results are given in terms of measured tensile strength in MN/m² after 28 days at 50° C, and as a percentage improvement on the comparable measured figure for the control. The results obtained with the different coating systems are shown in separate columns (1) to (5). The respective alternative coating systems used were:

1. A 10% solution of the aromatic compound under test in water, acetone or ethanol (as appropriate having regard to the solubility of the compound) was applied to the strand and dried at 50° C. A 10% W/W solution in chloroform of epoxy resin (5½ parts Epikote 828 and 1 part Epikure RTV hardener, both sold by Shell Chemicals Ltd.) was applied over the initial coating and cured at 80°C for 30 minutes.

2. A 10% solution of the aromatic compound under test in a 3% aqueous solution of polyethylene glycol was applied to the strand and dried at 50°C. An overcoating of epoxy resin was then applied as in (1).

3. A 10% solution was made up of the aromatic compound under test in a known size composition comprising a polyvinyl acetate of cationic character as described above, and this composition was applied to the strand and cured at 115°C for 30 minutes.

4. In some cases, the aromatic compound under test was found incompatible with the size composition used in (3). In such cases, a 10% solution of the aromatic compound in water was coated on to the strand, dried at 50°C for 30 minutes, and then overcoated with the size composition.

5. The system of (1) was followed except that a 5% solution of the epoxy resin in chloroform was used.

From the foregoing description of the coating systems it will be seen that in some cases it was considered necessary to apply a temporary protective over-coating over the coating which contained the aromatic compound, before encasing the strand in cement. This was done to ensure retention of all the varied compounds being tested during processing, and thus to prevent any variation in the rate of loss of material from the glass fibre surface other than that dictated by the chemical nature and physical properties of the protective material under test. This temporary over-coating prevented any initial leaching out of the protective material but did not act as a barrier during the accelerated testing of the rate of deterioration after the cement had set.

The Table indicates the name, and where practicable, the formula of each Example, in addition to the tensile strength of the fibres after 28 days at 50° C in a block of ordinary Portland cement, tested as outlined above, and the percentage improvement as compared with glass fibres coated with the carrier material alone.

Coating Systems

| Ex-ample No | Name | Formula | (1) Tensile Strength | (1) Improvement % | (2) Tensile Strength | (2) Improvement % |
|---|---|---|---|---|---|---|
| 0 | (Control - Carrier liquid only) | | 700 | 0 | 661 | 0 |
| 1 | 1,2,3 trihydroxybenzene (pyrogallol) | (structure: benzene with three OH groups at 1,2,3 positions) | 1075 | 53 | 1028 | 55 |
| 2 | Ammonium Oxidation salt of pyrogallol | | 1174 | 68 | 1044 | 58 |
| 3 | 2,4,6 trihydroxybenzene (phloroglucinol) | (structure: benzene with OH at 2,4,6 positions) | 813 | 16 | 737 | 11 |
| 4 | 2,3,4 trihydroxybenzoic acid | (structure: benzene with OH at 2,3,4 and COOH) | 1091 | 56 | 846 | 28 |

Coating Systems-continued

| Ex. ample No | Name | Formula | (1) Tensile Strength | Improvement % | (2) Tensile Strength | Improvement % |
|---|---|---|---|---|---|---|
| 5 | 3,4,5 trihydroxybenzoic acid (gallic acid) | | 864 | 23 | 638 | −3 |
| 6 | 2,4,6 trihydroxybenzoic acid | | 988 | 41 | 842 | 27 |
| 7 | 2,4,6 trihydroxybenzaldehyde | | 691 | −1 | 792 | 20 |
| 8 | 2,3,4 trihydroxyacetophenone | | 992 | 42 | 801 | 21 |
| 9 | propyl gallate | | 1084 | 55 | 795 | 20 |
| 10 | 2,4,6 trihydroxy pyrimidine (barbituric acid) | | 845 | 21 | 711 | 15 |
| 11 | tetrahydroxy-p-quinone dihydrate | | 878 | 25 | 813 | 22 |

Coating Systems-continued

| Example No | Name | Formula | (1) Tensile Strength | (1) Improvement % | (2) Tensile Strength | (2) Improvement % |
|---|---|---|---|---|---|---|
| 12 | purpurogallin | | 1001 | 43 | 1025 | 55 |
| 13 | tannic acid | | 978 | 40 | 964 | 46 |
| 14 | 1,2,4 trihydroxybenzene (hydroxyhydroquinone) | | 1010 | 44 | 1024 | 55 |
| 15 | 1,3,5 trihydroxytriazine (cyanuric acid) | | 758 | 8 | 640 | −3 |
| 16 | 2,4,6 trihydroxybenzophenone | | 939 | 34 | | |
| 17 | 1,2,4 trihydroxyanthraquinone (purpurin) | | 940 | 34 | | |

| Example No. | Name | Formula | (3) Tensile Strength | (3) Improvement % | (4) Tensile Strength | (4) Improvement % |
|---|---|---|---|---|---|---|
| 0 | (Control - Carrier liquid only) | | 610 | | 610 | 0 |
| 1 | 1,2,3 trihydroxybenzene (pyrogallol) | | 970 | 59 | 834 | 36 |

Coating Systems-continued

| Ex. ample No | Name | Formula | (3) Tensile Strength | Improve- ment % | (4) Tensile Strength | Improve- ment % |
|---|---|---|---|---|---|---|
| 2 | Ammonium Oxidation salt of pyrogallol | | 978 | 60 | | |
| 3 | 2,4,6 trihydroxybenzene (phloroglucinol) | | 807 | 28 | | |
| 4 | 2,3,4 trihydroxybenzoic acid | | 826 | 35 | | |
| 5 | 3,4,5 trihydroxybenzoic acid (gallic acid) | | | | 668 | 9 |
| 6 | 2,4,6 trihydroxybenzoic acid | | 723 | 18 | | |
| 7 | 2,4,6 trihydroxybenzaldehyde | | | | 919 | 51 |
| 8 | 2,3,4 trihydroxyaceto- phenone | | 573 | −6 | | |
| 9 | propyl gallate | | | | 836 | 37 |

Coating Systems-continued

| Ex. ample No | Name | Formula | (3) Tensile Strength | Improvement % | (4) Tensile Strength | Improvement % |
|---|---|---|---|---|---|---|
| 10 | 2,4,6 trihydroxy pyrimidine (barbituric acid) | | 680 | 11 | | |
| 11 | tetrahydroxy-p-quinone dihydrate | | 831 | 36 | | |
| 12 | purpurogallin | | | | 902 | 50 |
| 13 | tannic acid | | 871 | 43 | | |
| 14 | 1,2,4 trihydroxybenzene (hydroxyhydroquinone) | | | | 1116 | 83 |
| 15 | 1,3,5 trihydroxytriazine (cyanuric acid) | | 647 | 6 | | |
| 16 | 2,4,6 trihydroxybenzophenone | | | | | |
| 17 | 1,2,4 trihydroxanthraquinone (purpurin) | | | | | |

Coating Systems-continued

| Ex. ample No | Name | Formula | Coating Systems (1) Tensile Strength | (1) Improvement % | (5) Tensile Strength | (5) Improvement % |
|---|---|---|---|---|---|---|
| 18 | Ammonium oxidation product of gallic acid | | 915 | 31 | | |
| 19 | 2,4,6 trihydroxyaceto-phenone | (structure shown: 2,4,6-trihydroxyacetophenone) | 1063 | 52 | | |
| 20 | Grape tannin | ⎫ | 875 | 25 | 842 | 20 |
| 21 | Chestnut Powder (Harshaw Chemicals Ltd, Glasgow) | | 1062 | 52 | 838 | 20 |
| 22 | Liquid Suma Extract (Harshaw) | | 947 | 35 | 901 | 29 |
| 23 | Liquid Tara Extract ( " ) | ⎬ Natural tannins | 870 | 24 | 835 | 19 |
| 24 | Tannic Acid technical No. 1 (Harshaw) | | 1033 | 48 | 922 | 32 |
| 25 | Tannic acid technical T (Harshaw) | | 932 | 33 | 795 | 28 |
| 26 | Tannic acid technical XXC (Harshaw) | ⎭ | 1011 | 44 | 860 | 23 |
| 27 | Tannic acid technical XXS (Harshaw) | ⎫ | 1025 | 46 | 891 | 27 |
| 28 | Dried Quebracho Powder (Harshaw) | ⎬ Natural tannins | 986 | 41 | 822 | 18 |
| 29 | Claroton Mimosa Powder (Harshaw) | | 936 | 34 | 878 | 26 |
| 30 | Mimosa Extract (liquid) | | 934 | 33 | | |
| 31 | Neogram Extract (liquid) | ⎭ | 961 | 37 | | |

The ammonium oxidation salts of pyrogallol and of gallic acid (examples 2 and 18) are the products obtained by dissolving the pyrogallol or gallic acid in water to give a 10% W/V solution. Adjusting the pH to 11 by addition of concentrated ammonia solution, and evaporating the solution to dryness. The precise structure of these products is not known but they are believed to retain the three hydroxyl groups of the parent compounds, combined with $NH_4^+$ radicals.

It will be seen from the Table that the relative effectiveness of the various compounds is clearly demonstrated by the screening test, though more detailed full-scale tests over a longer period are necessary to establish the precise degree of effectiveness of each compound. It is believed that the relatively low effectiveness observed for cyanuric acid (Example 15) is due to the fact that it has a relatively low solubility in a calcium hydroxide solution. A percentage improvement figure of less than 10% is an indication that the compound is not suitable for use in the invention.

More detailed tests were carried out, using the compounds of Examples 1, 3 and 12 from the above Table, incorporated in a conventional size composition.

The size composition was made up of the following constituents:

| | Weight % |
|---|---|
| Polyvinyl acetate of cationic character, namely a co-polymer of average molecular weight 80,000 derived from vinyl acetate and 2% of 2-dimethylamino ethyl methacrylate stabilised with 1% of a cationic surfactant, sold as "National 102-1209" by National Adhesives and Resins Ltd. | 14.0 |
| A pelargonic acid - tetraethylene pentamine condensate solubilised with acetic acid, sold as AHCO 185 AE by Arnold Hoffman | 0.02 |
| A caprylic acid-tetraethylene pentamine condensate solubilised with acetic acid, sold as AHCO 185 AN by Arnold Hoffman | 0.01 |
| A polyethylene glycol sold as "Carbowax 1000" by Union Carbide Corporation | 0.10 |
| γ-aminopropyltriethoxysilane, sold as "A 1100 silane" by Union Carbide | 0.25 |
| An amide condensate of stearic acid and tetraethylene pentamine sold as "Cationic X" | 0.20 |
| Water | to 100 |

The solids content of this size was between 6.5 and 7.0% by weight.

Four samples of this size were taken. To three of these samples amounts of 10% by weight of pyrogallol, 10% by weight of phloroglucinol, and 5% by weight or purpurogallin, respectively were added. The four samples were then used to coat strands of the substantially alkali-resistant zirconia-containing glass referred to above as Glass No. 1, under identical conditions. The strands of fibres coated with the different samples of size were tested as described above by encasing the middle section of each strand in a respective block of ordinary Portland cement paste and determining the tensile strength of the encased part by applying load to both ends of the strand. Specimens were allowed to set at 100% Relative Humidity and room temperature for 24 hours and then immersed in water at 50°C. Samples were tested after the 24 hour cure, i.e. immediately before immersion in water and after 2, 4, 8 and 12 weeks in water, simulating periods of several years at normal temperatures, under continuously wet conditions, which are the most arduous conditions likely to be experienced in practice.

The results are shown graphically in FIG. 1 of the accompanying drawings. Curve 1 shows the variation in tensile strength with time for the strands coated with the size containing pyrogallol, curve 2 the results obtained with the size containing phloroglucinol and curve 3 the results with the size containing purpurogallin, while curve 4 shows for comparison the results with the conventional size alone. It will be seen that pyrogallol and purpurogallin (which is an oxidation product of pyrogallol) reduced the deterioration in strength of the glass fibres by about 50% while phloroglucinol also produced a substantial improvement.

Figure 2:
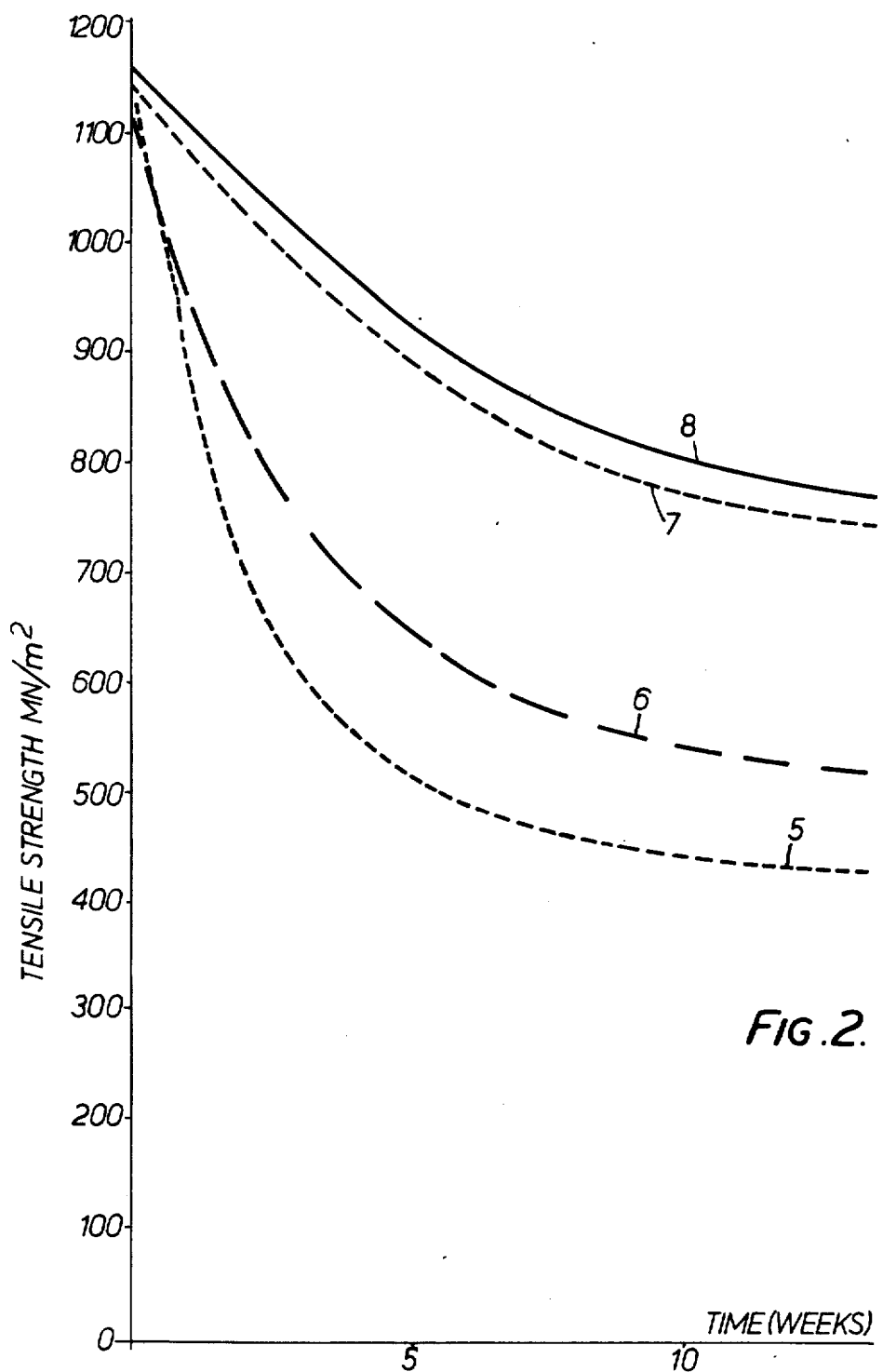
FIG. 2 is a graphical representation similar to FIG. 1 comparing the effects of size compositions containing various amounts of pyrogallol, again under accelerated ageing conditions.

Further similar tests were then carried out on strands made up from fibres of the same glass, sized with similar compositions containing 0%, 1%, 5% and 10% of pyrogallol, applied to the fibres with a roller applicator of conventional type as the fibres were drawn from a brushing. The results are plotted in FIG. 2. They indicate that the tensile strength of the strand of glass fibres coated with the conventional size without pyrogallol (curve 5) diminished to just over 37% of its original value after 8 weeks and then remained substantially constant. With 1% pyrogallol in the size (curve 6) the initial strength was slightly lower than with the conventional size, but the figures after 2 weeks and each period thereafter were higher. A major advantage can, however, be seen where the size contained 5% pyrogallol (curve 7) and 10% pyrogallol (curve 8). The initial strength was similar to that with no pyrogallol but the reduction with time was much less marked. After 12 weeks the tensile strength was still approximately 70% of its initial value. The fact that the curves for 5% and 10% pyrogallol are similar indicates that little advantage is likely to be gained from adding larger quantities.

FIG. 2a illustrates the results obtained on similar samples to those described in the preceding paragraph, after storage in water at room temperature for periods of up to 18 months. In this test, simulating natural ageing under very damp conditions, the deterioration in strength is much less marked. Curves 5a, 6a, 7a and 8a represent the results obtained with 0%, 1%, 5% and 10% pyrogallol in the size composition. It will be seen that 1% pyrogallol produced a significant improvement while 5% and 10% pyrogallol produced a major and lasting advantage such that, after 18 months the tensile strength of the fibres was only marginally, if at all, lower than after the initial cure (24 hours at 100% relative humidity).

Figure 3:
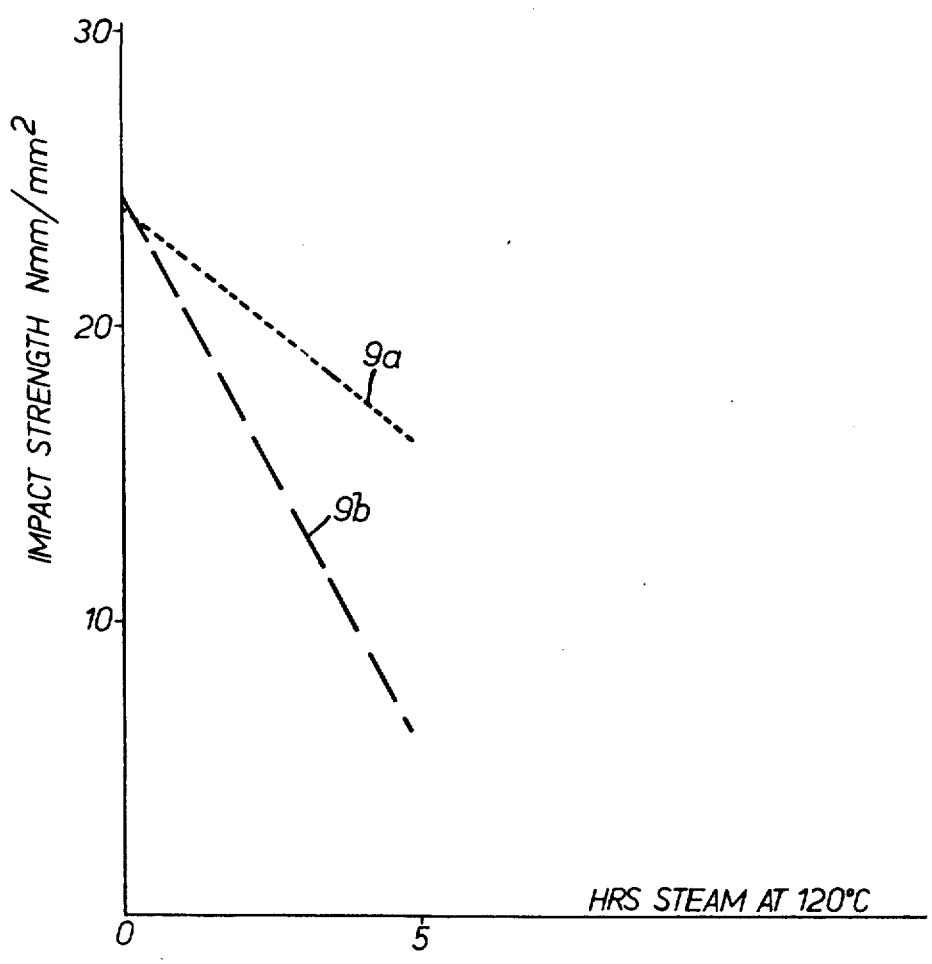
FIG. 3 is a graphical representation of the effect on the impact strength of a glass-fibre reinforced cement of use of pyrogallol in the size composition for the glass fibres.

Samples of glass fibre reinforced cement were made from boards of dimensions 2 × 1 metre randomly reinforced with glass fibres of Glass No. 1, some boards incorporating fibres sized with a conventional size and others incorporating fibres sized with a size containing 5% by weight of pyrogallol, the boards being formed by spraying glass fibres and cement on to a mould surface. The impact strength of the samples was tested immediately after curing of the cement composite (1 day at room temperature) and again after 5 hours steam treatment at 120° C to produce rapid ageing. The results are illustrated in FIG. 3, showing that the samples initially had similar impact strengths but the samples made from glass fibres sized with the composition containing pyrogallol (curve 9a) retained a very much higher proportion of this initial strength after accelerated ageing than the samples without pyrogallol (curve 9b).

To compare the effect of coating compositions containing pyrogallol on different types of alkali-resistant glass, tests were made on strands of glass fibres of Glass No. 1 and of glass fibres of the following composition by weight, hereinafter referred to as Glass No. 2:

| | |
|---|---|
| $SiO_2$ | 60.6% |
| $Al_2O_3$ | 0.5% |
| $ZrO_2$ | 10.6% |
| $Na_2O$ | 14.4% |
| $K_2O$ | 2.8% |
| $TiO_2$ | 5.8% |
| $CaO$ | 5.4% |

Figure 4:
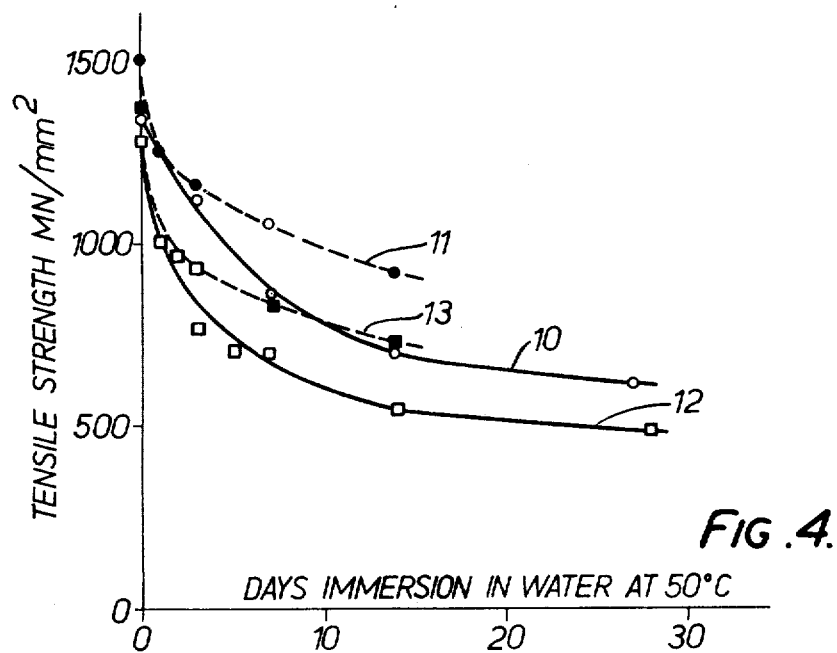
FIG. 4 is a graphical representation similar to FIG. 1 of tensile strengths obtained with fibres of two different glass compositions, with size compositions with and without pyrogallol.

Strands coated with the cationic polyvinyl acetate size composition described in detail above as a control were compared with strands coated with the same size composition containing 5% of pyrogallol, both being encased in cement blocks as before. The results are plotted in FIG. 4, in which line 10 represents Glass No. 1 with size coating only, line 11 represents Glass No. 1 with size including pyrogallol, line 12 represents Glass No. 2 with size coating only and line 13 represents Glass No. 2 with size including pyrogallol. In each case, the inclusion of pyrogallol notably reduced the deterioration in strength of the glass fibres.

Figure 5:
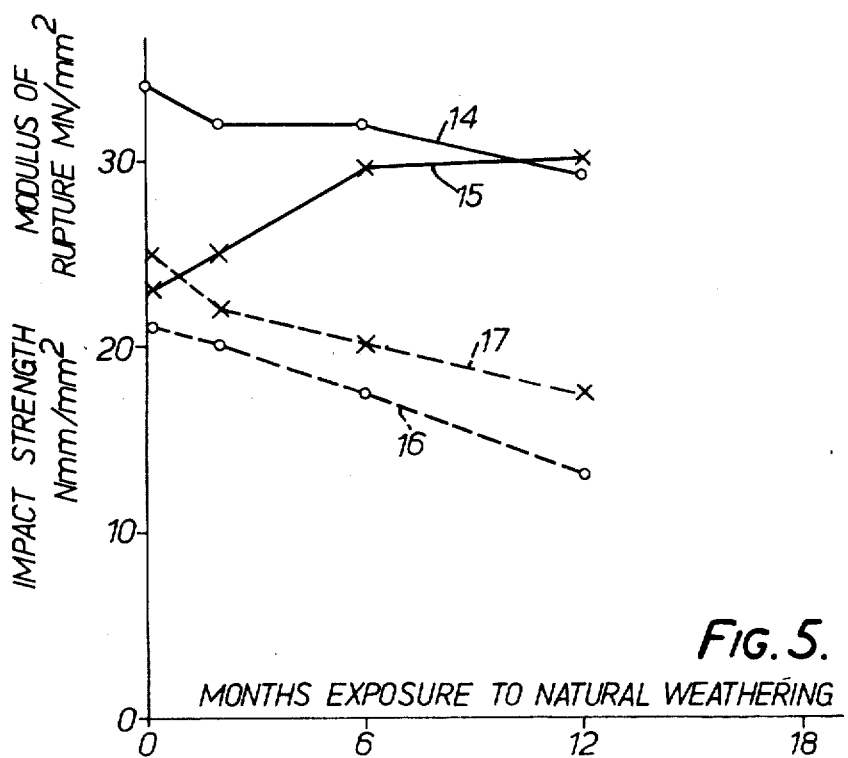
FIG. 5 illustrates results obtained by testing cement boards incorporating glass fibre reinforcement for flexural and impact strength after natural weathering for up to 12 months.

To assess the long-term characteristics of cement products reinforced with coated glass fibres in accordance with the invention, boards of ordinary Portland cement were made up with 5% by weight of glass fibres of Glass No. 1 as reinforcement, as described above with reference to FIG. 3, and were exposed to natural weathering for periods of up to 12 months. Sample boards were tested for modulus of rupture (flexural strength) and for impact strength, first after 7 days initial cure at 100% relative humidity and 21 days air cure, and subsequently after 2, 6 and 12 months exposure to natural weathering. The results are illustrated in FIG. 5, in which line 14 shows the modulus of rupture of boards reinforced with glass fibres coated with the size composition alone, line 15 shows the modulus of rupture for boards sized with the composition including 5% pyrogallol, line 16 shows the impact strength of the boards with size-coated fibres and line 17 shows the impact strength of the boards with fibres coated with the composition including pyrogallol. It will be seen that under natural conditions, without accelerated ageing, the boards containing fibres reinforced with pyrogallol had equal or better flexural strength than the control after a year and showed no deterioration in this respect, while the impact strength remained at all times substantially higher than that of the control.

Figure 6:
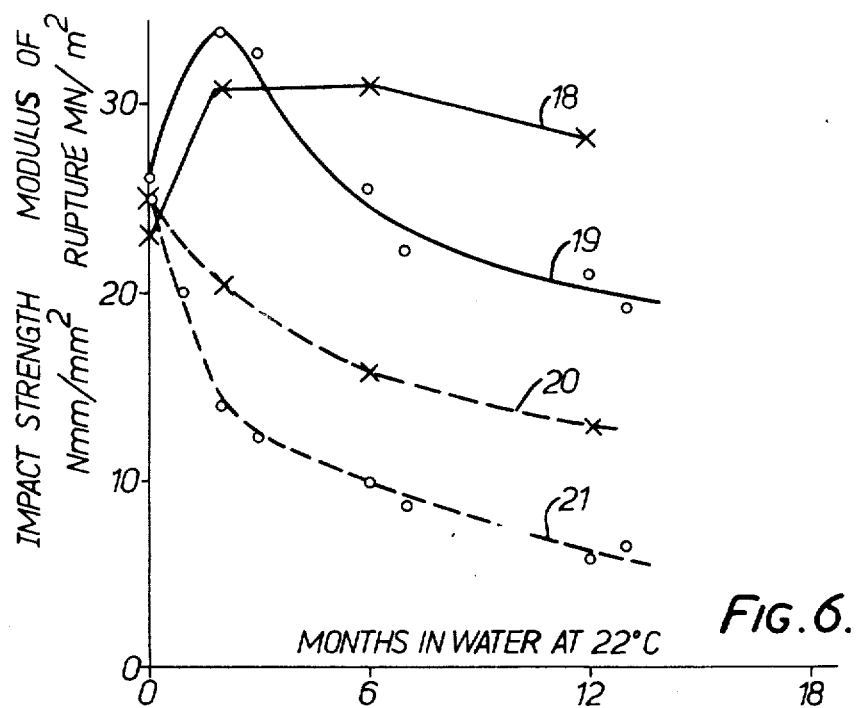
FIG. 6 illustrates similar results obtained by testing such boards after immersion in water at 22°C for up to 12 months.

Similar sets of boards were tested for modulus of rupture and impact strength after immersion in water at 22°C for periods of up to 12 months. The results are shown graphically in FIG. 6. Lines 18 and 19 represent the modulus of rupture of the boards reinforced with fibres with and without pyrogallol in the coating composition, respectively, while lines 20 and 21 represent the impact strength with and without pyrogallol in the coating composition.

Figure 7:
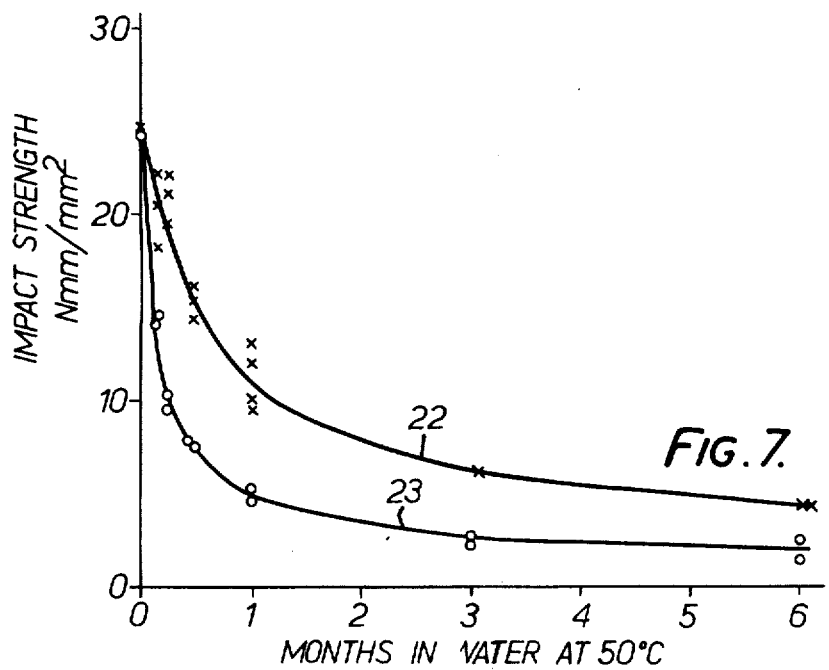
FIG. 7 illustrates results obtained on similar boards after accelerated ageing for up to 6 months.

Further accelerated ageing tests were made on similar boards by immersion in water at 50°C for periods of up to 6 months, which is believed to be equivalent to many years (certainly over 10 years) natural ageing. The effect on the impact strength of the boards is shown graphically in FIG. 7, in which line 22 represents the impact strength of the boards reinforced with fibres coated with the size composition containing 5% pyrogallol, and line 23 represents the impact strength of the boards with fibres coated with the size composition alone. It can be seen that the improvement in impact strength over the control was well maintained throughout the period of testing. The rate of diminution of impact strength with time was reduced to a very small value with both types of board.

The incorporation of the coated glass fibres into a cementitious mix can be effected by a spray-up technique. In this technique, a cement slurry and chopped glass fibers are sprayed on to a paper covered perforated face of a suction mould. The mould is provided with adjustable screed boards round its edges thus allowing sheets of various thicknesses to be manufactured. After spraying to get a desired thickness, the top surface is levelled, and excess water removed by the application of suction. The sheet can then be transferred to a support by inverting the mould, and is then covered and stored until the desired curing time has passed, whereupon the board is ready for use. The water/cement ratio of the slurry is chosen according to the nature of the cement used. The glass fibre is fed as a roving to a chopper, and the length of the chopped material can be adjusted by varying the number of blades in the chopper. The glass to cement ratio is controlled by altering the number of rovings fed into the chopper at the same chopping rate, or by varying the speed of the chopper.

I claim:

1. A cementitious product comprising cement and, as reinforcement, glass fibres coated with a composition which consists essentially of a protective material to reduce deterioration of the glass fibres, said protective material being a monocyclic or polycyclic aromatic compound which has at least three hydroxyl groups on the aromatic ring or when a polycyclic compound is employed, on at least one of the aromatic rings.

2. A cementitious product according to claim 1, wherein the aromatic compound is soluble in a calcium hydroxide solution.

3. A cementitious product according to claim 1, wherein the aromatic compound is a monocyclic 6-membered-ring compound having at least three hydroxyl groups substituted in the ring.

4. A cementitious product according to claim 3, wherein the aromatic compound is pyrogallol.

5. A cementitious product according to claim 3, wherein the aromatic compound is hydroxy hydroquinone.

6. A cementitious product according to claim 3, wherein the aromatic compound is phloroglucinol.

7. A cementitious product according to claim 1, wherein the aromatic compound is a product obtained by oxidation in alkaline solution of a monocyclic 6-membered-ring compound having at least three hydroxyl groups substituted in the ring.

8. A cementitious product according to claim 7, wherein the aromatic compound is an ammonium oxidation salt of pyrogallol.

9. A cementitious product according to claim 1, wherein the aromatic compound is a monocyclic 6-membered-ring compound having at least three hydroxyl groups and at least one other group substituted in the ring, or a carboxylic acid salt or ester thereof.

10. A cementitious product according to claim 9, wherein the aromatic compound is 2,3,4 tri-hydroxybenzoic acid.

11. A cementitious product according to claim 9, wherein the aromatic compound is 3,4,5 tri-hydroxybenzoic acid (gallic acid).

12. A according to claim 9, wherein the aromatic compound is propyl gallate.

13. A cementitious product according to claim 9, wherein the aromatic compound is 2,4,6 tri-hydroxybenzoic acid.

14. A cementitious product according to claim 9, wherein the aromatic compound is 2,4,6 tri-hydroxybenzaldehyde.

15. A cementitious product according to claim 9, wherein the aromatic compound is 2,3,4 tri-hydroxyacetophenone.

16. A cementitious product according to claim 9, wherein the aromatic compound is 2,4,6 tri-hydroxyacetophenone.

17. A cementitious product according to claim 9, wherein the aromatic compound is tetrahydroxy-p-quinone dihydrate.

18. A cementitions product according to claim 1, wherein the aromatic compound is a product obtained by oxidation in alkaline solution of a monocyclic 6-membered-ring compound having at least three hydroxyl groups and at least one other group substituted in the ring.

19. A cementitious product according to claim 18, wherein the aromatic compound is an ammonium oxidation salt of gallic acid.

20. A cementitious product according to claim 1, wherein the aromatic compound is a hetero-monocyclic 6-membered-ring aromatic compound having two nitrogen atoms within the ring and at least three hydroxyl groups as substituents in the ring.

21. A cementitious product according to claim 20, wherein the aromatic compound is 2,4,6 tri-hydroxypyrimidine (barbituric acid).

22. A cementitious product according to claim 1, wherein the aromatic compound is a polycyclic aromatic hydrocarbon having at least three hydroxyl groups substituted in a single 6-membered ring.

23. A cementitious product according to claim 22, wherein the aromatic compound is purpurogallin.

24. A cementitious product according to claim 22, wherein the aromatic compound is 1,2,4 tri-hydroxyanthraquinone (purpurin).

25. A cementitious product according to claim 22, wherein the aromatic compound is 2,4,6 tri-hydroxy benzophenone.

26. A cementitious product according to claim 22, wherein the aromatic compound is tannic acid.

27. A cementitious product according to claim 22, wherein the aromatic compound is a naturally occurring vegetable tannin.

28. A cementitious product according to claim 1, wherein said composition further contains a film-forming agent and a linking agent.

29. A cementitious product according to claim 28, wherein the film-forming agent comprises a polyvinyl acetate of cationic character.

30. A cementitious product according to claim 28, wherein the film-forming agent comprises a polyethylene glycol of non-ionic character.

31. A cementitious product according to claim 28, wherein the linking agent is a silane.

32. A cementitious product according to claim 1, said fibres being formed from an alkali-resistant glass containing at least 5 mol % $ZrO_2$.

33. A cementitious product according to claim 32, said glass fibres having a further protective coating applied after the glass fibres have been coated with said composition.

34. A cementitious product according to claim 33, wherein said further protective coating is an epoxy resin polymer.

35. A method of forming a glass fibre reinforced cementitious product, said method comprising the steps of coating glass fibres with a composition which consists essentially of a protective material to reduce deterioration of the glass fibres, said protective material being a monocyclic or polycyclic aromatic compound which has at least three hydroxyl groups on the aromatic ring or when a polycyclic compound is employed, on at least one of the aromatic rings, and subsequently incorporating said coated glass fibres into a cementitious matrix comprising cement.

36. A method according to claim 35, comprising applying the coating composition as a size to the individual glass fibres immediately after they have been drawn from the molten glass composition.

37. A method according to claim 35, comprising applying the coating composition to the glass fibres after sizing and combination of the individual fibres into a strand.

38. A method according to claim 35, wherein said glass fibres are of an alkali-resistant glass composition containing at least 5 mol % $ZrO_2$.

* * * * *